United States Patent [19]
Hein et al.

[11] 3,875,186
[45] Apr. 1, 1975

[54] PROCESS FOR THE PRODUCTION OF TETRABROMOPHTHALIC ANHYDRIDE

[75] Inventors: Hilmar Hein, Wiesbaden-Kohlheck; Karlheinz Janzon, Grossauheim; Wolfgang Weigert, Offenbach; Christa Liedtke, Bruchkobel; Rudolf Muller, Freigericht, all of Germany

[73] Assignee: Deutsche Gold-und Silber-Scheideanstalt vormals Roessler, Frankfurt (Main), Germany

[22] Filed: Oct. 10, 1973

[21] Appl. No.: 405,082

[30] Foreign Application Priority Data
Oct. 14, 1972 Germany............. 2250550

[52] U.S. Cl. .................................................. 260/346.3
[51] Int. Cl. ................................................. C07c 63/14
[58] Field of Search ...................................... 260/346.3

[56] References Cited
UNITED STATES PATENTS

| | | | |
|---|---|---|---|
| 3,194,817 | 7/1965 | Hahn | 260/346.3 |
| 3,382,254 | 5/1968 | Jenkner et al. | 260/346.3 |

Primary Examiner—Henry R. Jiles
Assistant Examiner—Bernard I. Dentz
Attorney, Agent, or Firm—Cushman, Darby & Cushman

[57] ABSTRACT

Tetrabromophthalic anhydride is produced by brominating phthalic anhydride at elevated temperatures in the presence of sulfuric acid and a bromination catalyst using bromine and hydrogen peroxide as the brominating agent.

9 Claims, No Drawings

PROCESS FOR THE PRODUCTION OF TETRABROMOPHTHALIC ANHYDRIDE

The invention is directed to a process for the production of tetrabromophthalic anhydride by bromination of phthalic anhydride. Tetrabromophthalic anhydride is especially useful as a flame protecting agent.

It is known to recover tetrabromophthalic anhydride by the action of bromine on phthalic anhydride in the presence of bromination catalysts such as iodine and iron powder. The reaction is carried out in fuming sulfuric acid containing 20 to 80% free sulfur trioxide. By using bromine in large excess and adding chlorine favorable yields were obtained. However, temperatures of 240° to 260°C, and reaction times of 20 hours were required (German Auslegeschrift 1,125,415); by the use of approximated stoichiometrical amounts of bromine without the addition of chlorine and temperatures between 80° and 150°C the yields are only 75% (Great Britain Pat. No. 1,084,375). The British patent also shows that small amounts of halogenating catalysts such as iron, aluminum and iodine are emphasized.

There has now been found a process for the production of tetrabromophthalic anhydride by bromination of phthalic anhydride at elevated temperature in the presence of sulfuric acid and bromination catalysts (such as any of those mentioned above, for example) in what there is used as the brominating agent bromine and hydrogen peroxide. The process differs from all known processes especially advantageously in that fuming sulfuric acid is not necessary. Surprisingly, in spite of the consequently substantially milder reaction conditions, high yields are produced in a shorter time.

To carry out the process of the invention phthalic anhydride is reacted in sulfuric acid solution with bromine and hydrogen peroxide in the presence of a bromination catalyst. Generally it is advantageous to apply the phthalic anhydride as a solution in concentrated sulfuric acid and to gradually add to this solution the bromine and hydrogen peroxide, and next at least partially the bromine.

It is suitable to use sulfuric acid having an $H_2SO_4$ content of at least about 90 weight %, preferably concentrated sulfuric acid. As stated, however, the sulfuric acid need not be fuming. The amount of sulfuric acid is generally so chosen that for each mole of phthalic anhydride about 10 to 60 moles, especially 20 to 40 moles of sulfuric acid are present.

The bromine is added in the amount required stoichiometrically for bromination, namely 2 moles of bromine for each mole of phthalic anhydride, or a slight excess of bromine can be used, seldom amounting to more than 10%.

There can be used generally 2 to 4 moles, especially 2.5 to 3.5 moles of hydrogen peroxide per mole of phthalic anhydride. Suitably the hydrogen peroxide is used as an aqueous solution of about 50 to 90 weight %, preferably of about 70 weight %. It can be advantageous to add the hydrogen peroxide as a mixture with sulfuric acid. It is especially suitable to use a mixture of 70% hydrogen peroxide with concentrated sulfuric acid in the ratio of about 0.1 to 1.5 moles of hydrogen peroxide for each mole of sulfuric acid.

As bromination catalysts there can be used any of the customary ones for this purpose, e.g., any of those mentioned above. Preferably iodine is used, most preferably in the amount of 0.003 to 0.1 mole of iodine per mole of phthalic anhydride. The iodine is suitable introduced with the bromine.

The reaction takes place at elevated temperatures between about 30 and 130°C. It is advantageous to use temperatures between 50° and 110°C, especially between 60° and 100°C.

Unless otherwise indicated, all parts and percentages are by weight.

EXAMPLE 1

In a stirrer vessel provided with a reflux condenser there was warmed to 65°C a solution of 334 grams (2.26 moles) of phthalic anhydride in 4 liters of concentrated sulfuric acid having a density of 1.84 g/l, then there was next added dropwise in the course of one hour a mixture of 776 grams (4.85 moles) of bromine and 1.7 grams of iodine and finally there was added in the course of 2½ hours 660 ml of a mixture of 2 parts by weight of concentrated sulfuric acid having a density of 1.84 g/l and one part by weight of 70% hydrogen peroxide having a density of 1.29 g/l. The mixture was held between 64° and 66°C during the addition of the bromine, at a temperature between 65° and 100°C during the addition of the hydrogen peroxide and then held for 1 hour at 100°C and finally cooled. The tetrabromophthalic anhydride formed was filtered off, next washed with water and then with a mixture of equal parts by weight of water and methanol and subsequently dried. The product had a bromine content of 68.1% and a melting point between 277° and 279°C. The yield amounted to 930 grams, corresponding to 89% based on the phthalic anhydride added.

EXAMPLE 2

In a stirrer vessel provided with a reflux condenser there was warmed to 65°C a solution of 42 grams (0.28 mole) of phthalic anhydride in 600ml of sulfuric acid having a density of 1.84 g/l (10.8 moles $H_2SO_4$,) then there was next added dropwise in the course of 50 minutes a mixture of 30.5 ml (0.60 mole) of bromine and 0.2 grams of iodine and finally in the course of 280 minutes 37.5 ml of 70% hydrogen peroxide (0.99 mole of $H_2O_2$). The mixture was then held at 85°C for 60 minutes and then cooled. The tetabromophthalic anhydride formed was separated from the reaction mixture by filtration, next washed with water and then with a mixture of equal parts by weight of water and methanol and finally dried under reduced pressure at 70°C. The product had a bromine content of 68.5% and a melting point between 279°C, and 280°C. The yield amounted to 110 grams, corresponding to 84% based on the phthalic anhydride added.

EXAMPLE 3

There was added to a solution of 84 grams (0.57 mole) of phthalic anhydride in 940 ml of sulfuric acid having a density of 1.84 g/l (17.0 moles of $H_2SO_4$) 61 ml (1.2 moles) of bromine and 0.4 grams of iodine. The mixture was heated to 60°C in the course of 70 minutes. Then it was treated dropwise in the course of 165 minutes with 64 ml of 70% hydrogen peroxide (1.7 moles of $H_2O_2$) and then held for one hour at 90°C. The tetrabromophthalic anhydride produced was recovered in the manner described in Example 2. It had a bromine content of 67.8% and a melting point of 270°C. The yield amounted to 112 grams, corresponding to 81% based on the phthalic anhydride added.

While it is preferred to add the bromine prior to adding the hydrogen peroxide, they can be added together or a part of the bromine can be added followed by adding the rest of the bromine with the hydrogen peroxide. The hydrogen peroxide can also be added before the bromine.

We claim:

1. A process for the production of tetrabromophthalic anhydride comprising brominating phthalic anhydride at elevated temperature in the presence of sulfuric acid and a bromination catalyst using bromine and hydrogen peroxide as the brominating agent.

2. A process according to claim 1 wherein there is added bromine and a mixture of 70% hydrogen peroxide and concentrated sulfuric acid as the brominating agent.

3. A process according to claim 1 wherein there are used at least 2 moles of bromine per mole of phthalic anhydride.

4. A process according to claim 3 wherein the sulfuric acid employed has a concentration of at least 90% but is below that of fuming sulfuric acid.

5. A process according to claim 4 wherein there is used bromine in an amount of from 2 moles to up to 10% excess of the stoichiometric amount required to form the tetrabromophthalic anhydride, the sulfuric acid is used in an amount of 10 to 60 moles per mole of phthalic anhydride and the hydrogen peroxide is used in an amount of 2 to 4 moles per mole of phthalic anhydride and the temperature is 50° to 110°C.

6. A process according to claim 5 wherein the catalyst is iron, aluminum or iodine.

7. A process according to claim 6 wherein the catalyst is iodine, the iodine is used in an amount of 0.003 to 0.1 mole per mole of phthalic anhydride, the sulfuric acid is used in an amount of 20 to 40 moles per mole of phthalic anhydride, the hydrogen peroxide is used in an amount of 2.5 to 3.5 moles per mole of phthalic anhydride and the temperature is 60° to 100°C.

8. A process according to claim 7 wherein the bromine and iodine catalyst are added to the sulfuric acid containing phthalic anhydride and then the hydrogen peroxide is added to the resulting mixture.

9. A process according to claim 5 wherein the bromine is added to the sulfuric acid containing phthalic anhydride and then the hydrogen peroxide is added to the resulting mixture.

* * * * *